(12) United States Patent
Lockhart (10) Patent No.: US 9,545,091 B2
(45) Date of Patent: Jan. 17, 2017

(54) RETAINER APPARATUS

(71) Applicant: Brian Lee Lockhart, Northglenn, CO (US)

(72) Inventor: Brian Lee Lockhart, Northglenn, CO (US)

( * ) Notice: Subject to any disclaimer, the term of this patent is extended or adjusted under 35 U.S.C. 154(b) by 140 days.

(21) Appl. No.: 14/656,343

(22) Filed: Mar. 12, 2015

(65) Prior Publication Data
US 2016/0262363 A1 Sep. 15, 2016

(51) Int. Cl.
*A01K 97/06* (2006.01)

(52) U.S. Cl.
CPC ..................... *A01K 97/06* (2013.01)

(58) Field of Classification Search
USPC ........................ 43/57.1, 57.2, 54.1
See application file for complete search history.

(56) References Cited

U.S. PATENT DOCUMENTS

| | | | |
|---|---|---|---|
| 3,101,964 A | 8/1963 | Reaser | |
| 3,645,419 A * | 2/1972 | Shorrock | A01K 97/06 206/315.11 |
| 3,800,456 A * | 4/1974 | Rowe | A01K 97/06 43/25.2 |
| 4,081,923 A * | 4/1978 | Pruncutz | A01K 91/04 43/25.2 |
| 4,452,003 A * | 6/1984 | Deutsch | A01K 97/06 206/315.11 |
| 4,563,834 A | 1/1986 | Spencer | |
| 4,757,637 A * | 7/1988 | Christensen | A01K 97/06 43/57.1 |
| 4,769,941 A * | 9/1988 | Schmidt | A01K 97/06 43/57.1 |
| 4,884,357 A * | 12/1989 | Clifford | A01K 97/06 43/25.2 |
| 4,936,040 A * | 6/1990 | Reiter | A01K 97/06 43/25.2 |
| 5,123,199 A * | 6/1992 | Lysohir | A01K 97/06 43/25.2 |
| 5,337,511 A | 8/1994 | Ashbaugh | |
| 5,357,707 A | 10/1994 | Lewis | |
| 6,079,148 A | 6/2000 | Yonenoi | |
| 6,367,190 B1 | 4/2002 | Looney et al. | |
| 6,474,013 B2 | 11/2002 | Terry | |

(Continued)

FOREIGN PATENT DOCUMENTS

SE     WO 8911791 A1 * 12/1989 .......... A01K 797/06

*Primary Examiner* — Christopher P Ellis
(74) *Attorney, Agent, or Firm* — Roger A. Jackson (57) ABSTRACT

A retainer apparatus for a hook, the hook having opposing open and closed hook end portions, the retainer apparatus includes a beam and an extension element having an elongated loop shape that defines an aperture with a portion of the loop affixed to the beam. Also included is a resilient component with an outer surface, the resilient component encompasses the extension element and a portion of the beam, the resilient component having a slit extending from the outer surface inward to manually open the slit and expose a portion of the extension element. Operationally, the open slit allows the hook open end portion to be manually placed within the loop, when the slit is released the slit compressively sandwiches the hook about the extension element to removably retain the hook to the retainer apparatus with the hook closed loop end portion exposed outside of the outer surface.

12 Claims, 9 Drawing Sheets

(56) References Cited

U.S. PATENT DOCUMENTS

2010/0180489 A1* 7/2010 Benesh ............... A01K 97/06
              43/57.1
2011/0041382 A1* 2/2011 Boling ............... A01K 97/06
              43/54.1
2012/0055962 A1  3/2012 Lee et al.

* cited by examiner

RETAINER APPARATUS

TECHNICAL FIELD

The present invention relates generally to an apparatus, which is employed to retain a hook wherein the apparatus is also attached to an article. More particularly, the present invention of the retainer apparatus facilitates the easy and fast removable engagement of a fishing hook to the retainer apparatus that is also attached to the article, with the operational result of ready and easy access to a fisherman for their fish hook that can also include a leader line, bait, lure, bubble, swivel, hook, and the like, wherein the fish hook is positively retained i.e. cannot slip of fall out of the retainer apparatus.

BACKGROUND OF INVENTION

In many types of fishing there is a need to have a supply of different fish hooks readily available, however, fish hooks by their nature are difficult to handle due to very sharp tip points and barbs that are also sharp resulting in a user easily pricking themselves with these points or barbs when reaching for instance into a small box containing multiple fish hooks. Thus in the prior art it is fundamental to separate the fishhooks in storage so that they can be grabbed one at a time on the end of the fish hook opposite of the tip point and barbs. This usually would result in some sort of clamping mechanism to sandwich the fish hook rod portion in a vise type of arrangement. Of course problematic in a vise type arrangement is that quick and easy removable engagement is difficult of the fish hook to and from the vise, because of the problem, this has resulted in using an elastomeric slit type of arrangement that indeed does facilitate quick and easy engagement/disengagement of the fish hook from the elastomeric slit.

However, problematic in the elastomeric slit is the lack of positive retention of the fish hook in the slit, as the slit in merely a light frictional grip that can deteriorate over time, thus potentially allowing the fish hook to dislodge from the slit which is especially unacceptable due to the inherent risk of the fish hook tip point or barbs being stepped on or inadvertently being brushed against by a hand or finger having a high potential for cuts and the like. Another benefit of the retainer apparatus for fish hooks is to hold the fish hook for tying the fish line to the fish hook end opposite of the point tip for securing a swivel, bubble, weights, and the like, thus with the user being able to desirably avoid holding the sharp tip and barbed fish hook for tying the various fish line knots on the fish hook.

Looking at the prior art in this area in U.S. Pat. No. 5,337,511 to Ashbaugh disclosed is a carrier for fishing lures that includes a cylindrical tube having a plurality of holes along the side wall for the length of the tube. In Ashbaugh the hook of the fishing lure may be inserted into any of the holes and positively retained when the carrier is in its normal substantially vertical position due to gravity. The shank of the lure hook in Ashbaugh will likewise depend downward to lie substantially parallel to the major axis of the cylindrical tube, and cannot easily discharge from the tube from the hole due to the abutting of the hook shank against the side of the tube, see in particular FIG. 2.

However, in Ashbaugh when the tube is swung to a horizontal position and twisted so the lure hook retaining holes face vertically upward, the hook shank will fall to a vertical position due to gravity to be perpendicular to the major axis of the tube and due to the relatively small diameter of the tube, the hook may then be lifted from the retaining hole in the tube for use, or a lure may be installed for storage in the tube. The tube in Ashbaugh is suspended from a belt attachment loop, which loop is easily removable and installable on a belt, see FIG. 1. One problem with the Ashbaugh carrier is that the hook retention relies solely on gravity to keep the hook trapped within the hole, wherein if the carrier should be bounced around creating momentary periods of no gravity, the hooks could bounce out of the holes.

Moving onward in the fish hook holder arts in U.S. Pat. No. 5,357,707 to Lewis disclosed is a fly fishing leader carrier is designed to retrievably store a plurality of fishing leaders on the back of a fisherman. The fishing leader carrier in Lewis includes an elongated rectangular fishing leader holder which has a number of stretchable elastic loops and an equal number of parallel slots designed to hold under tension an equal number of fishing leaders with the hooks disposed therethrough the elastic loops and the opposing leader lines wedged in a slot. In Lewis the fishing leader carrier also includes an elongated strap whose opposite ends are attached to the opposite ends of the elongated fishing leader holder plus the strap also includes a separable two-part buckle which enables the strap to be readily separated into two parts and then joined together. A drawback of Lewis is the size of the assembly and strapping it to the individuals back makes quick easy access to the hooks difficult.

Next in the prior art in the hook and line retention arts in United States Patent Application Number 2012/0055962 to Lee, et al. disclosed is a fishing line holder that can be either removably or permanently attached to a piece of clothing, such as a shirt is described. In one preferred use in Lee, the holder, which includes an elastomeric slit, permits a fisherman wearing a piece of clothing having the holder attached thereto to temporarily store a monofilament fishing line in the slit while he/she is making changes to his/her fishing rig. However, in Lee, there is no form of positive retention of the line other than compressive force on the line from the elastomeric slit.

Further in the hook and line retention arts in U.S. Pat. No. 6,367,190 to Looney, et al. disclosed is a fly harnessing and storage device, including a main body casing with an inner storage surface, are for attaching a plurality of fly hooks thereon via the use of foam rubber. The casing in Looney also has an aperture therethrough in which a flexible tubular member passes wherein the tubular member harnesses tippets which extend from the fly hooks, into the casing aperture connected end of the tubular member and extending beyond the opposite end of the tubular member. The tubular member in Looney also holds a loop feeder which permits a user to eye the loop with a tippet and pull the feeder to secure the tippet through the tubular member. In Looney, the hook insert into a foam linear protrusion 7, 9, and 11, again as in Ashbaugh and Lee there is no positive retention of the hooks, only an elastomeric frictional compression, meaning that the hooks could dislodge from the protrusion if moved suddenly.

Yet further in the hook and line retention arts in U.S. Pat. No. 4,563,834 to Spencer disclosed a fishing fly box includes a cylindrical housing in which a spool is located, the spool being mounted to rotate on hollow spindles that project inwardly from the end walls of the housing. The housing in Spencer has an opening which is normally closed by a cover, but when the cover is open, flanges at the end of the spool are exposed where they may be easily manipulated to turn the spool. In Spencer, strips 48 of soft retaining material extend axially along the spool to retain the flies, for the hooks of the flies are easily embedded in these strips. The fly box in Spencer is suspended from a lanyard, and to retrieve a fishing fly, the fisherman merely inserts a finger of his left hand into the spindle of the left end wall, and with the thumb of that hand moves the cover to its open position. Again in Spencer using the thumb the user turns the flange of the spool until the desired fly is at the opening, whereupon the fly is withdrawn, also the fly box has an end cap, which is easily detached from the right end wall, and it encloses an annular cavity for storing leaders. Further in Spencer, again as in Looney, Ashbaugh, and Lee there is no positive retention of the hooks, only an elastomeric frictional compression, meaning that the hooks could dislodge from the protrusion if moved suddenly.

Continuing in the hook and line retention arts in U.S. Pat. No. 6,079,148 to Yonenoi disclosed in an elastic fly holding mat, that like Lee only uses elastomeric slit compression to retain the hook, see FIGS. 2 and 3, not having a positive hook retention, but merely compressive frictional retention of the hook.

Moving onward in the hook and line retention arts in U.S. Pat. No. 3,101,964 to Reaser disclosed is a fish hook holder that uses an axially spring loaded reciprocating hook 34 to loop around the fish hook and thus urge the fish hook as against nozzle 19 to positively retain the fish hook, see FIGS. 3 and 4, however, with the arrangement Reaser can only retain a single fish hook at one time.

Again moving onward in the hook and line retention arts in U.S. Pat. No. 6,474,013 to Terry discloses a clam shell arrangement that sandwiches a fish hook wherein the clam shell half surfaces have cavities that substantially match that of the fish hook contour, wherein the clam shell halves encase the fish hook, see FIGS. 1, 2, and 3. Terry can only hold a single fish hook at a time and is limited to the pre-carved cavities conforming to the particular fish hook contour shape, and Terry only somewhat positively retains the fish hook in a loose manner as the cavities are loose fitting around the fish hook.

Continuing, in the hook and line retention arts in U.S. Pat. No. 4,081,923 to Pruncutz disclosed is a fish hook holder having a rigid bifurcated body with a hollow internal chamber with a plurality of hook engaging pins within the hollow body space, wherein a single end pinches the shaft end of the hook only allowing for a single hook to be retained at a time.

What is needed is a retaining apparatus for fish hooks that gives fisherman a safe and convenient way of holding fish hooks that are in close proximity to the fisherman, wherein the fish hooks are easily and quickly removably engagable from the retainer apparatus, however, with the fish hook being positively retained in the apparatus-having the advantages of a vise combined with the quick and easy removable engagement of an elastomeric slit. Additional desirable features of the retaining apparatus would include the ability to float in water-as there is a high likelihood of the retainer apparatus falling into the water, to protect the fisherman's fingers from direct exposure to the hook tip and barbs, and easy to secure and remove hooks from the retainer apparatus for users with large fingers, poor dexterity, and poor eyesight.

SUMMARY OF INVENTION

A retainer apparatus for a hook, the hook having an open hook end portion and an opposing closed loop end portion, the retainer apparatus includes a beam having a longitudinal axis, the beam having a first end portion and an opposing second end portion with the longitudinal axis spanning therebetween. Further included in the retainer apparatus is an extension element having a proximal end portion and an opposing distal end portion, the distal end portion including a generally elongated loop shape that defines an aperture. The loop having a major diameter and a minor diameter and a respective major axis and a respective minor axis, wherein the proximal end portion is affixed to the beam being positioned such that the major axis is perpendicular to the longitudinal axis and the minor axis is perpendicular to the longitudinal axis.

Also included in the retainer apparatus is a resilient component with an outer surface, the resilient component having an internal volume throughout of a resilient material, the volume being sufficient to encompass in a surrounding manner the extension element and a portion of the beam to anchor the extension element within the resilient component. The resilient component having a slit extending from the outer surface inward to the internal volume, the slit extending to a portion of the extension element distal end portion, the slit also having a lengthwise axis, wherein the lengthwise axis is positioned perpendicular to the minor axis and parallel to the longitudinal axis.

Operationally, the slit extends from the outer surface inward to manually expose a portion of the extension element distal end portion to allow the hook open end portion to be manually placed within the slit and then to be disposed therethrough the aperture when the slit is manually placed into an open state. Such that when released the slit compressively sandwiches the hook open end portion about the extension element distal end portion to removably positively retain the hook open end portion to the aperture when the slit is manually released into a default normally urged closed state such that the slit and the extension element distal end portion are not visible from the outer surface, wherein the hook closed end portion extends outward from the outer surface for user access.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 3 shows an opposing perspective view from FIG. 1, wherein

REFERENCE NUMBERS IN DRAWINGS

50 Retainer apparatus
55 Hook
60 Open end portion of the hook 55
65 Closed loop end portion of the hook 55
70 Beam
75 Longitudinal axis of the beam 70
80 First end portion of the beam 70
85 Second end portion of the beam 70
90 Extension element
95 Proximal end portion of the extension element 90
100 Distal end portion of the extension element 90
105 Generally elongated loop shape of the distal end portion 100
110 Generally elongated wire loop shape of the distal end portion 100
115 Aperture of the loop shape 105
120 Major diameter of the loop shape 105
125 Minor diameter of the loop shape 105
130 Major axis of the loop shape 105
135 Minor axis of the loop shape 105
140 Affixment of the proximal end portion 95 to the beam 70
145 Perpendicular position of the major axis 130 to the longitudinal axis 75
150 Perpendicular position of the minor axis 135 to the longitudinal axis 75
155 Resilient component
160 Outer surface of the resilient component 155
165 Internal volume of the resilient component 155
170 Slit of the resilient component 155
175 Lengthwise axis of the resilient component 155 slit 170
180 Perpendicular position of the lengthwise axis 175 to the minor axis 135
185 Parallel position of the lengthwise axis 175 to the longitudinal axis 75
190 Open state of the slit 170 to expose a portion of the extension element 90
195 Compressive sandwich of the slit 170 about the hook 55 and extension element 90 when the slit 170 is in the closed state 200
200 Closed state of the slit 170 being a default state to hide the slit 170 and the extension element 90 from the outer surface 160
205 Means for retaining the resilient component 155 on the beam 70
210 First expanded section
215 Affixment of the first expanded section 210 to the beam 70 first end portion 80
220 Second expanded section
225 Affixment of the second expanded section 220 to the beam 70 second end portion 85
230 Eyelet
235 Article
240 Grasping manually the resilient component 155 by the outer surface 160
245 Prying open the slit 170 manually from the default normally urged closed state 200 to expose the extension element 90 distal end portion 100 and the aperture 115 thus manually placing the slit 170 into the open state 190
250 Grasping manually the hook 55 closed loop end portion 65
255 Inserting manually therethrough the hook 55 open end portion 60 into the aperture 115
260 Positioning manually the hook 55 closed loop end portion 65 to be external to the resilient component 155 outer surface 160
265 Releasing the slit 170 open prying 245 thus allowing the slit 170 to return to the default normally urged closed state 200 such that the slit 170 compressively sandwiches 195 the hook 55 open end portion 60 about the extension element 90 distal end portion 100 to removably positively retain the hook 55 open end portion 60 to the aperture 115, thus operationally removably placing the hook 55 into the retainer apparatus 50

270 Removing the hook 55 open end portion 60 from the aperture 115

275 Moving the hook 55 to be outside of the resilient component 155 outer surface 160

280 Releasing the slit 170 open prying 245 thus allowing the slit 170 to return to the default normally urged closed state 200, thus operationally removing the hook 55 from the retainer apparatus 50

DETAILED DESCRIPTION

Figure 1:
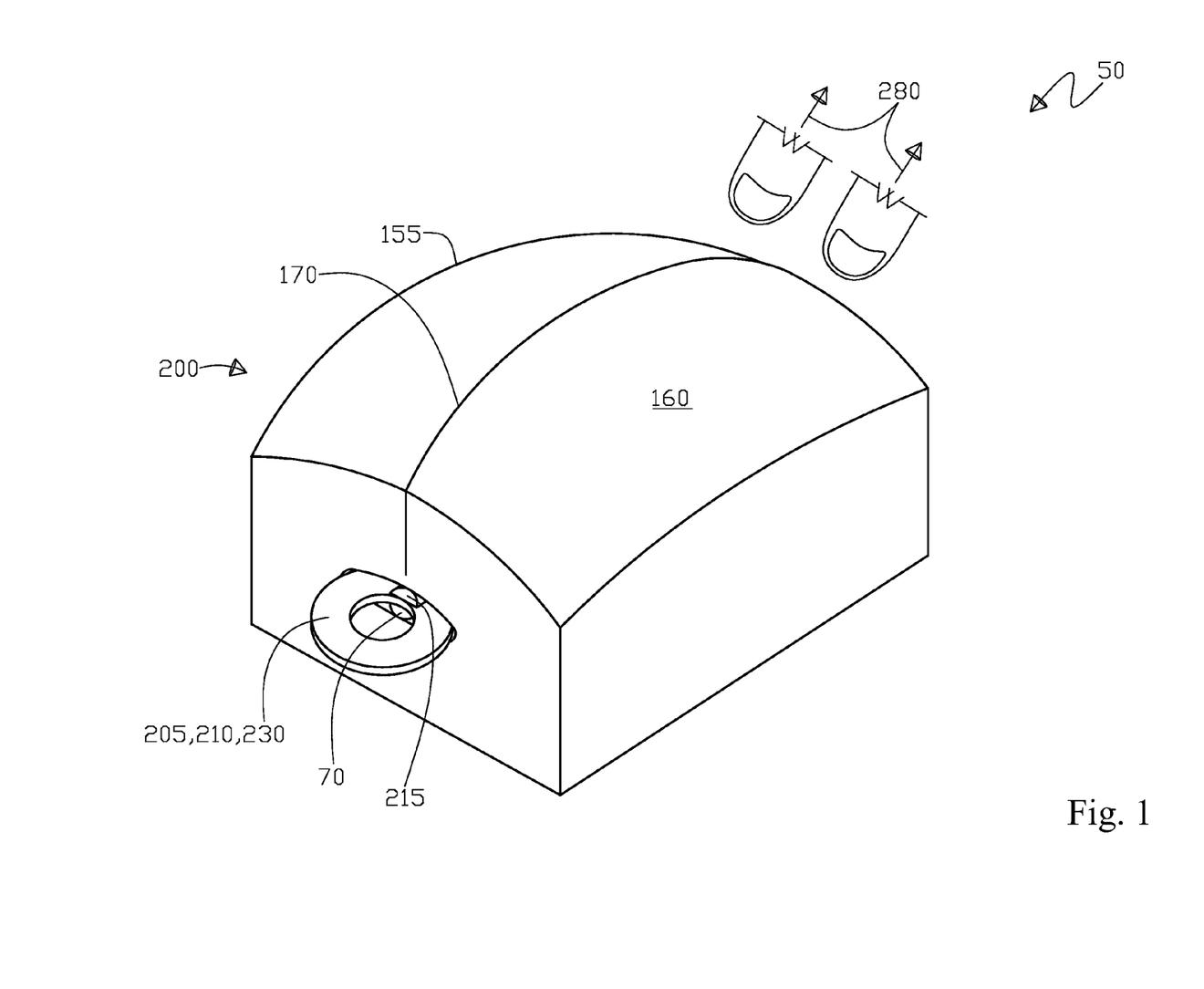
FIG. 1 shows a perspective view of the retainer apparatus showing a resilient component with a slit split line and outer surface with the resilient component slit in the closed state, plus a beam, and a means for retaining the resilient component in a form of an eyelet.
Figure 2:
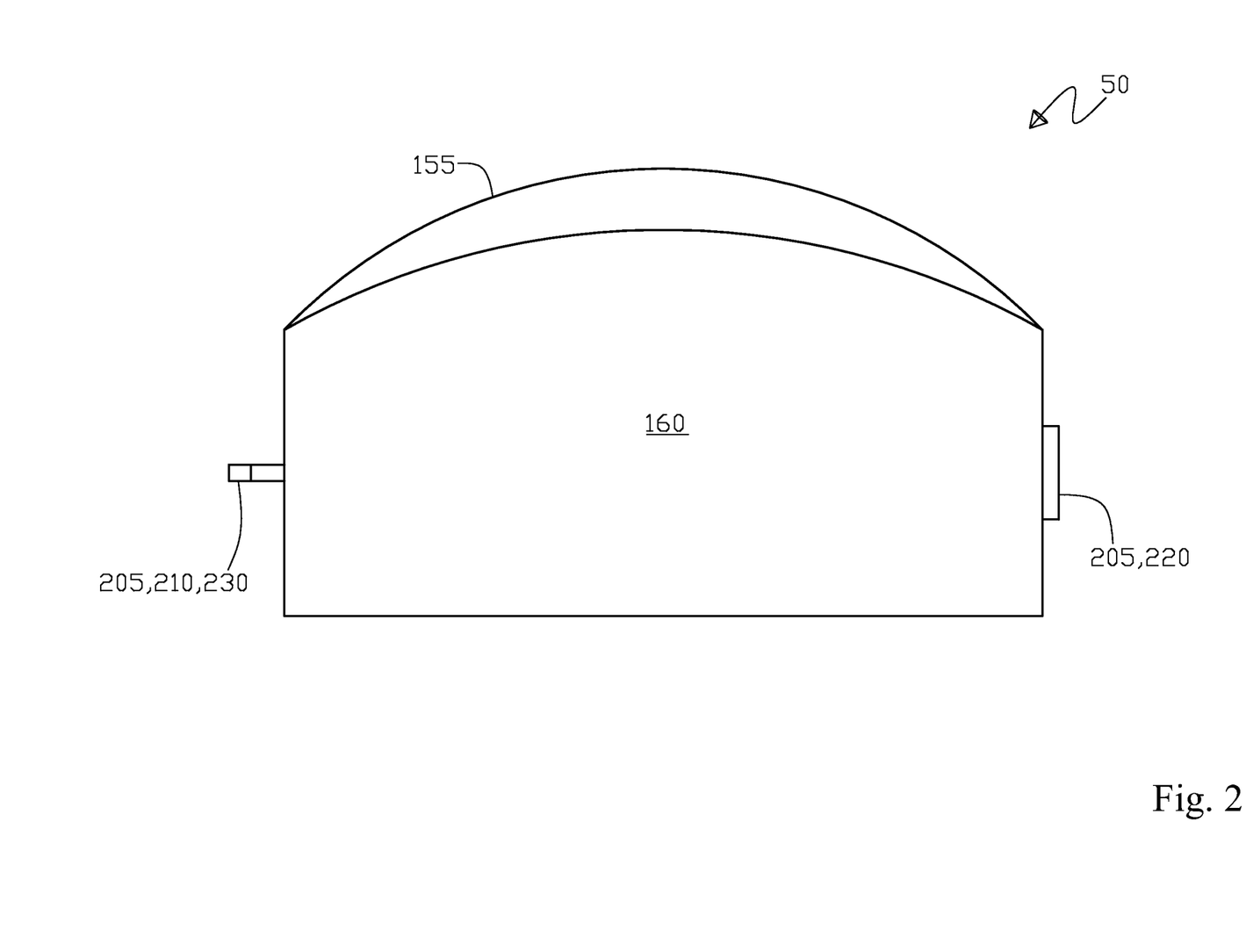
FIG. 2 shows a side elevation view of the retainer apparatus including the resilient component with the slit and the outer surface, plus the means for retaining the resilient component in the form of the eyelet and an opposing second expanded section.

With initial reference to FIG. 1 shown is a perspective view of the retainer apparatus 50 showing a resilient component 155 with a slit 170 split line and outer surface 160 with the resilient component 155 slit 170 in the closed state 200, plus a beam 70, and a means 205 for retaining the resilient component 155 in a form of an eyelet 230. Next, FIG. 2 shows a side elevation view of the retainer apparatus 50 including the resilient component 155 with the slit 170 and the outer surface 160, plus the means 205 for retaining the resilient component 155 in the form of the eyelet 230 and a second expanded section 220.

Figure 3:
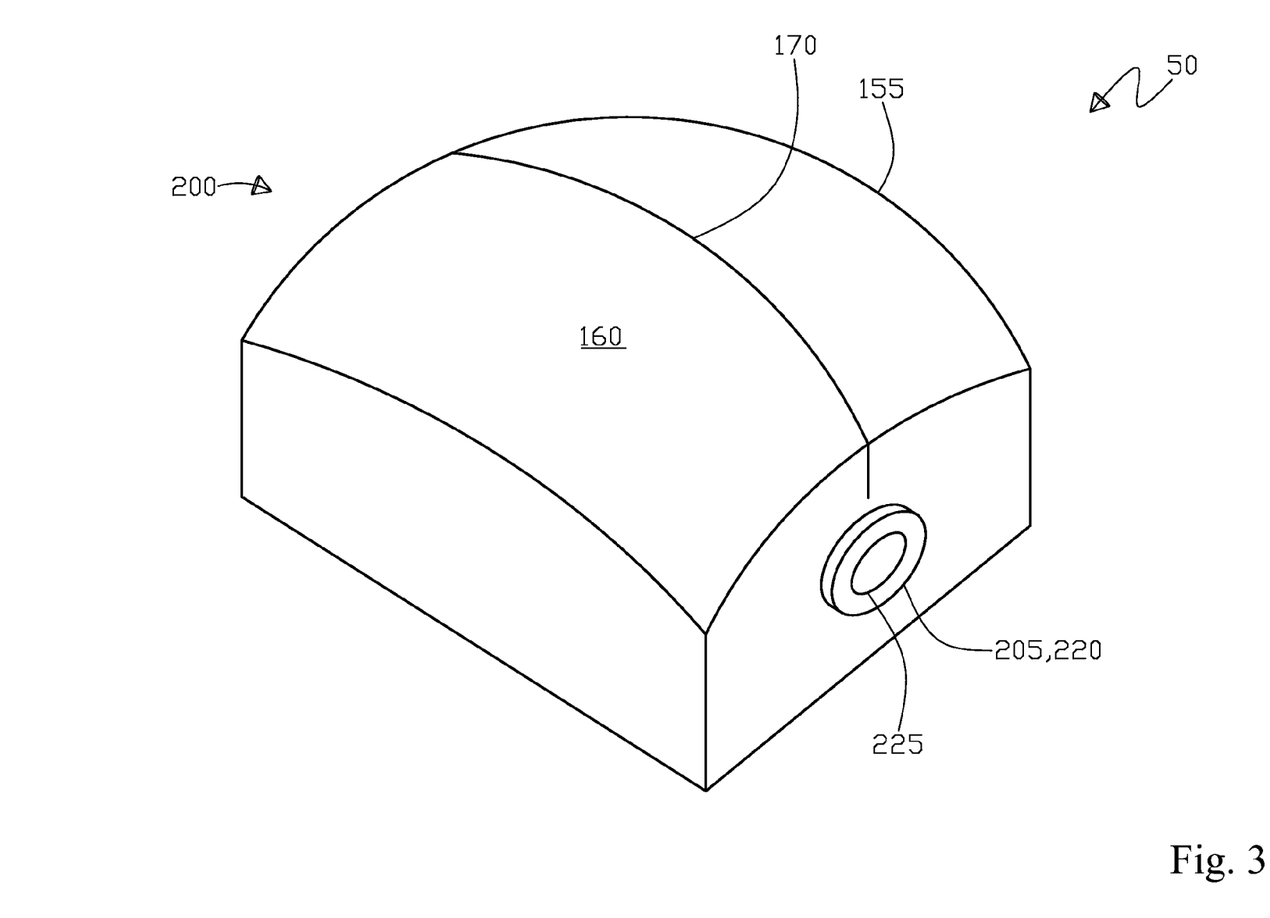
FIG. 3 shows a perspective view of the retainer apparatus showing the resilient component with the slit and the outer surface, plus the beam, and the means for retaining the resilient component in a form of the second expanded section.

Continuing, FIG. 3 shows an opposing perspective view from FIG. 1, wherein FIG. 3 shows a perspective view of the retainer apparatus 50 showing the resilient component 155 with the slit 170 and the outer surface 160, plus the beam 70, and the means 205 for retaining the resilient component 155 in a form of the second expanded section 220. Further, FIG. 4 shows a perspective view of the retainer apparatus 50 showing the resilient component 155 with the slit 170 and the outer surface 160, plus the beam 70, the means 205 for retaining the resilient component 155 in a form of the eyelet 230 and in an opposing position the second expanded section 220, with a series of hidden lines showing the beam 70 with its longitudinal axis 75 and first 80 and second 85 end portions, an extension element 90, with its loop 105, plus proximal 95 and distal 100 end portions, with the resilient component 155 in a closed state 200.

Figure 4:
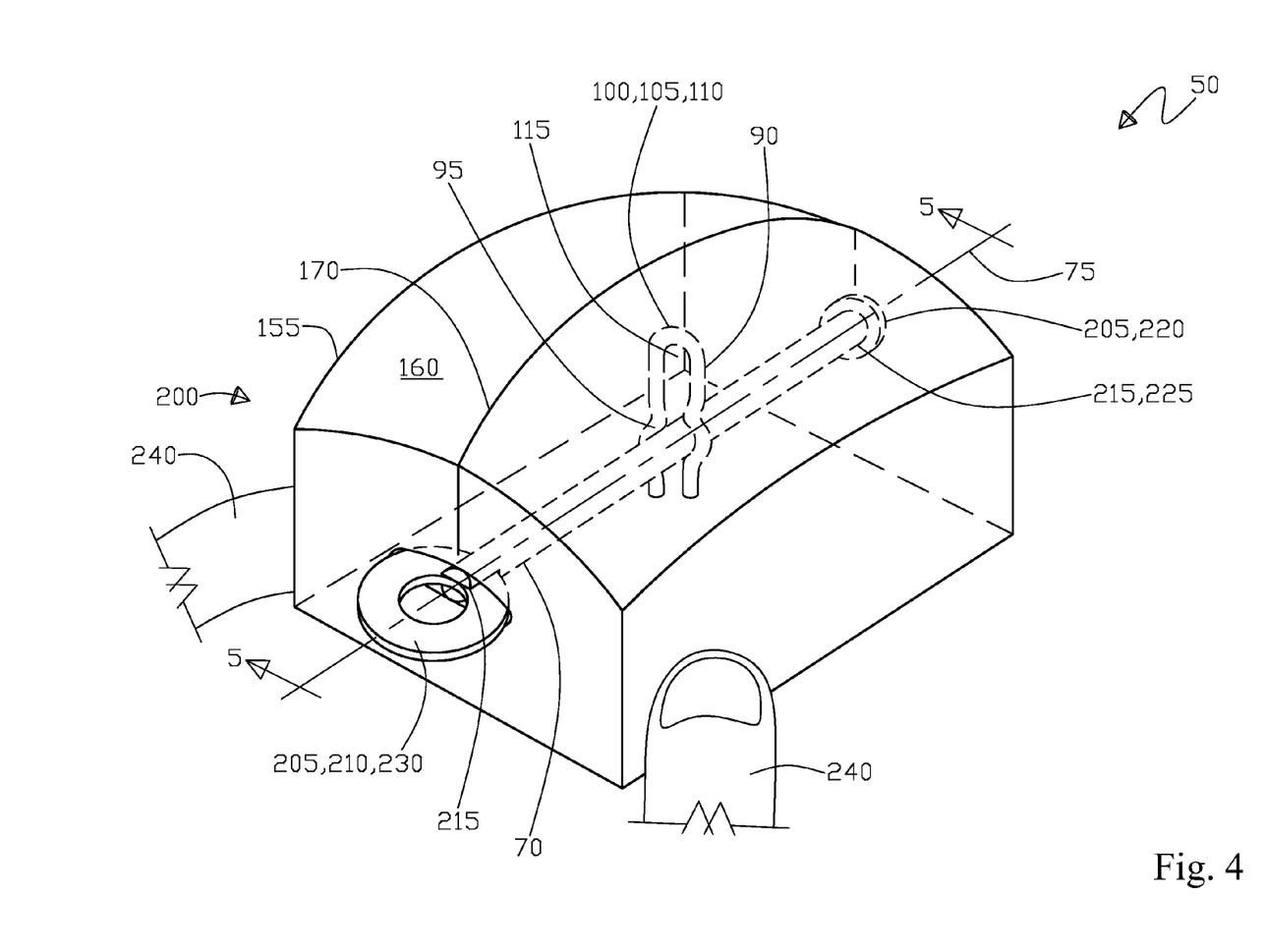
FIG. 4 shows a perspective view of the retainer apparatus showing the resilient component with the slit and the outer surface, plus the beam, the means for retaining the resilient component in a form of the eyelet and in an opposing position the second expanded section, with a series of hidden lines showing the beam with its longitudinal axis and first and second end portions, an extension element, with its loop, plus proximal and distal end portions, with the resilient component in a closed state.
Figure 5:
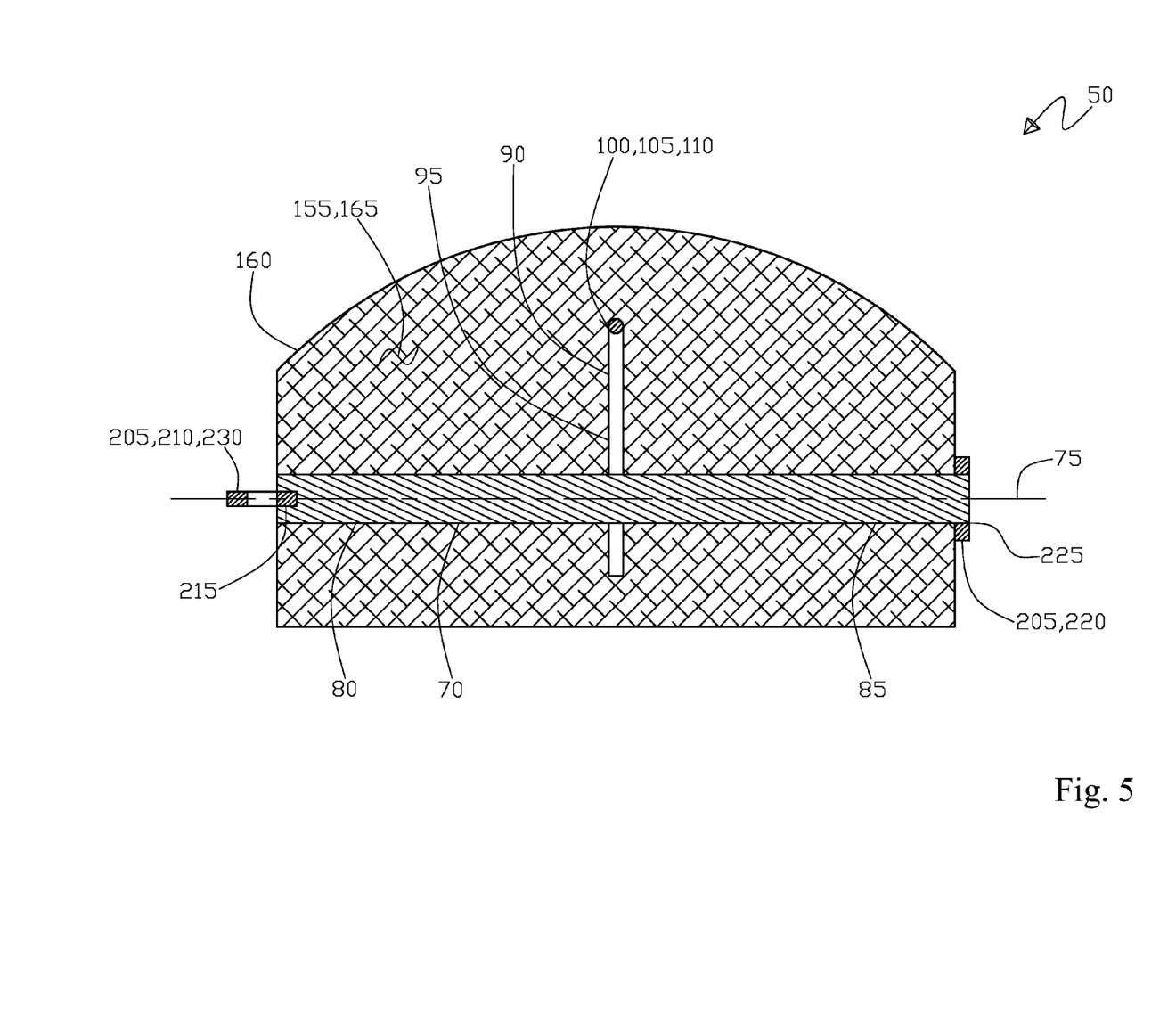
FIG. 5 shows cross section 5-5 from FIG. 4, wherein FIG. 5 of the retainer apparatus shows the resilient component cross sectioned at the slit and the resilient component outer surface, plus the beam, the means for retaining the resilient component in a form of the eyelet and in the opposing position the second expanded section, showing the beam with its longitudinal axis and the first and second end portions, the extension element, with its loop, plus the proximal and the distal end portions, with the resilient component in the closed state.

Yet further, FIG. 5 shows cross section 5-5 from FIG. 4, wherein FIG. 5 of the retainer apparatus 50 shows the resilient component 155 cross sectioned at the slit 170 and the resilient component 155 outer surface 160, plus the beam 70, the means 205 for retaining the resilient component 155 in a form of the eyelet 230 and in the opposing position the second expanded section 220, showing the beam 70 with its longitudinal axis 75 and the first 80 and second 85 end portions, the extension element 90, with its loop 105, plus the proximal 95 and the distal 100 end portions, with the resilient component 155 in the closed state 200.

Figure 6:
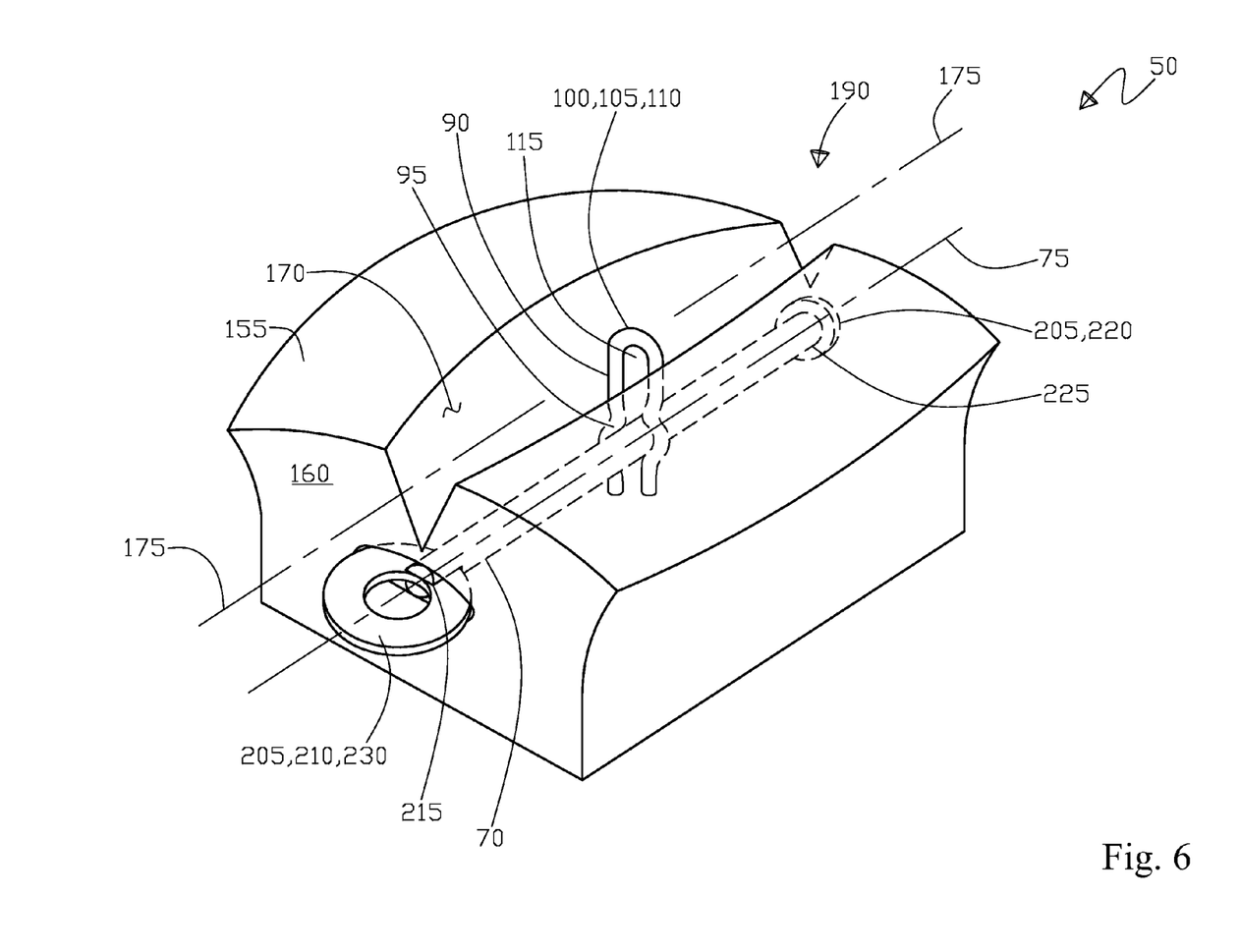
FIG. 6 shows a perspective view of the retainer apparatus showing the resilient component with the slit open in the open state and the outer surface of the resilient component, plus the beam, the means for retaining the resilient component in a form of the eyelet and in an opposing position the second expanded section, with a series of hidden lines showing the beam with its longitudinal axis and first and second end portions, the extension element, with its loop, plus the proximal and distal end portions, with the resilient component in an open state.

Next, FIG. 6 shows a perspective view of the retainer apparatus 50 showing the resilient component 155 with the slit 170 open in the open state 190 and the outer surface 160 of the resilient component 155, plus the beam 70, the means 205 for retaining the resilient component 155 in a form of the eyelet 230 and in an opposing position the second expanded section 220, with a series of hidden lines showing the beam 70 with its longitudinal axis 75 and first 80 and second 85 end portions, the extension element 90, with its loop 105, plus the proximal 95 and distal end 100 portions, with the resilient component 155 in an open state 190.

Figure 7:
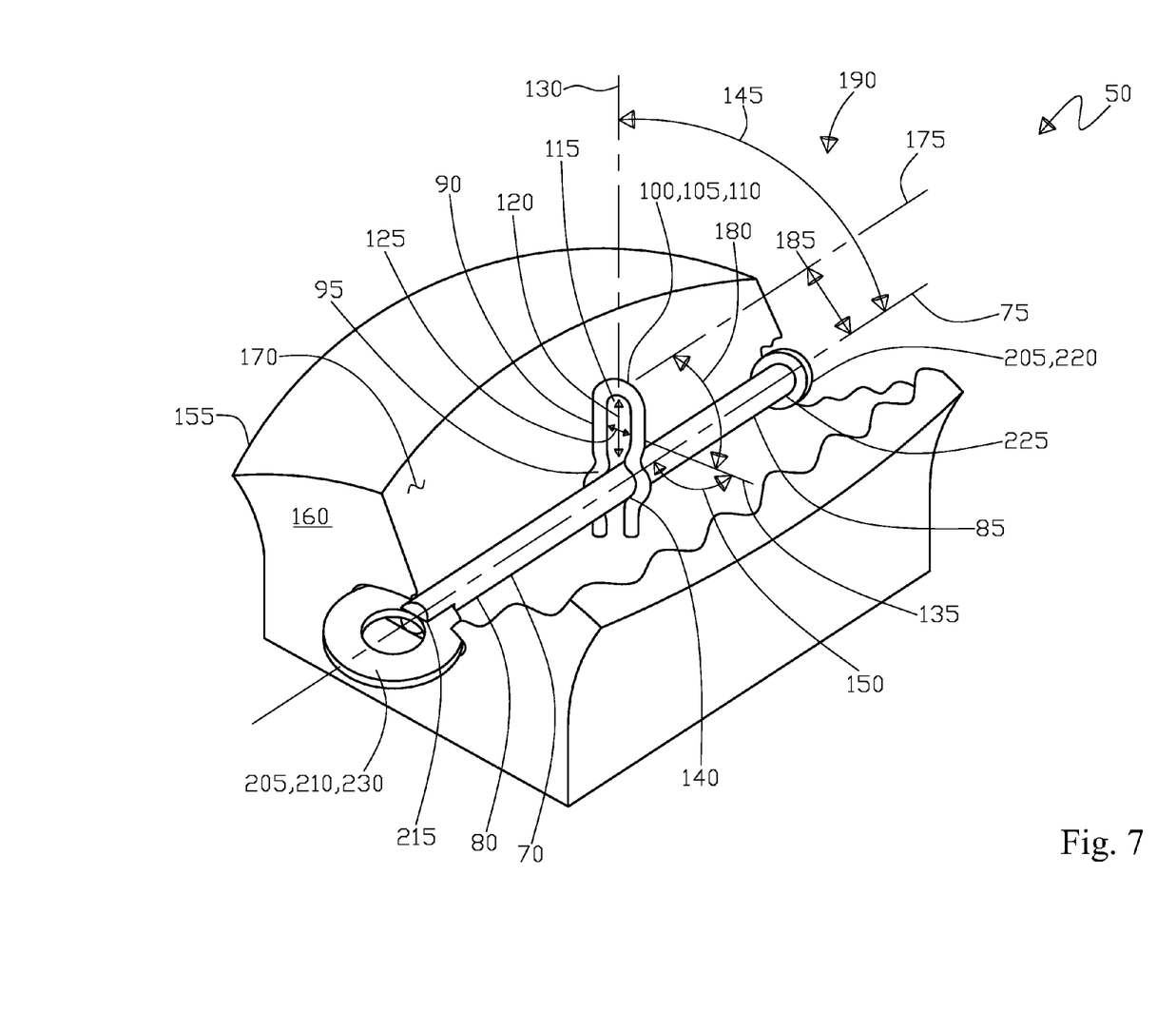
FIG. 7 shows a perspective view of the retainer apparatus of FIG. 6, however, with a portion of the resilient component cut away to expose the beam and extension element in solid lines showing the resilient component with the slit open I the open state and the outer surface of the resilient component, plus the beam, the means for retaining the resilient component in a form of the eyelet and in the opposing position the second expanded section, plus showing the beam with its longitudinal axis and the first and the second end portions, the extension element, with its loop, plus the proximal and the distal end portions, with the resilient component in an open state.

Continuing, FIG. 7 shows a perspective view of the retainer apparatus 50 of FIG. 6, however, with a portion of the resilient component 155 cut away to expose the beam 70 and extension element 90 in solid lines showing the resilient component 155 with the slit 170 open in the open state 190 and the outer surface 160 of the resilient component 155, plus the beam 70. Also shown in FIG. 7 is the means 205 for retaining the resilient component 155 in a form of the eyelet 230 and in the opposing position the second expanded section 220, plus showing the beam 70 with its longitudinal axis 75 and the first 80 and the second 85 end portions, the extension element 90, with its loop 105, plus the proximal 95 and the distal 100 end portions, with the resilient component 155 in an open state 190.

Figure 8:
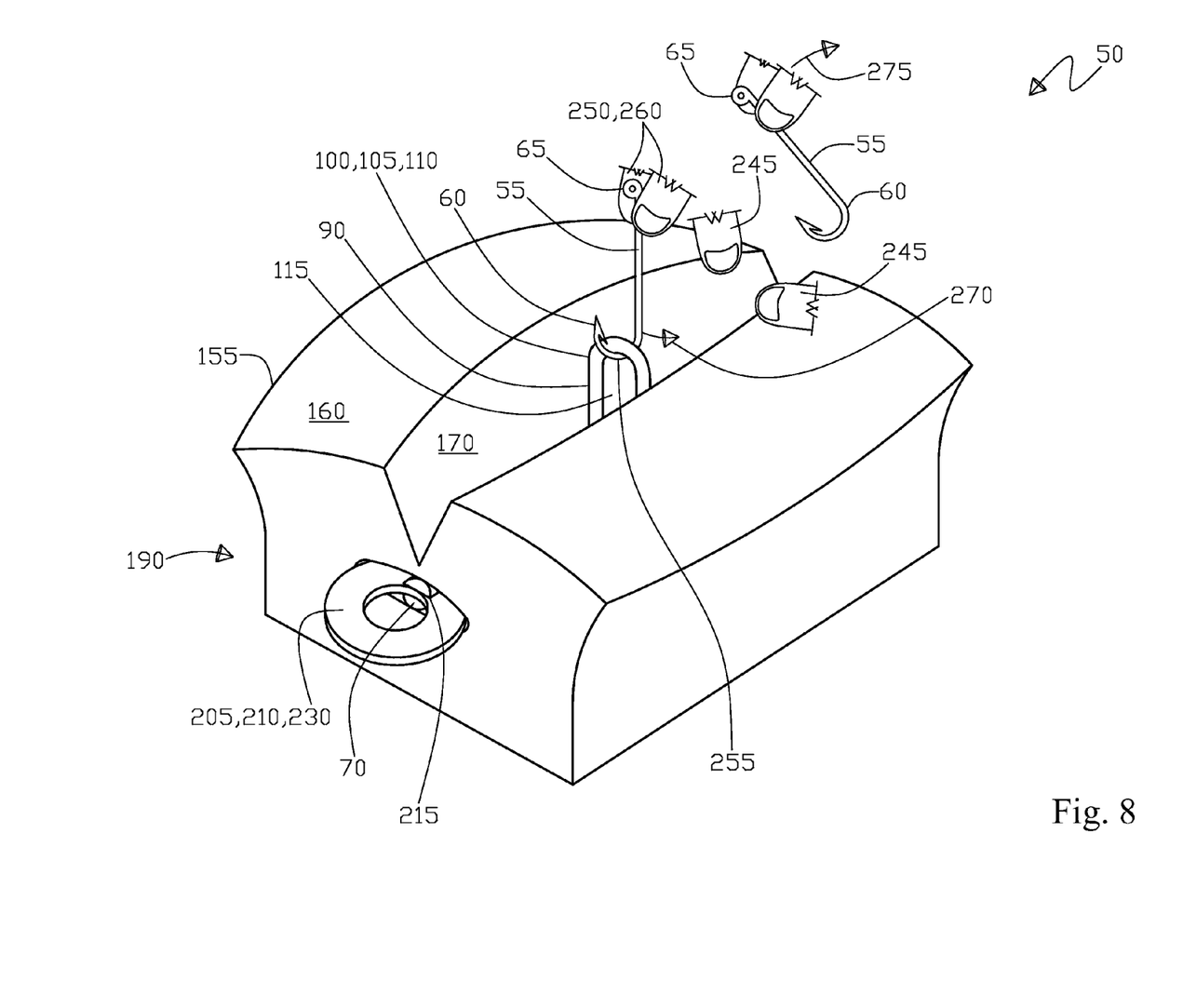
FIG. 8 shows a use perspective view of the retainer apparatus showing the resilient component with the slit open in the open state and the outer surface of the resilient component, plus the beam, the means for retaining the resilient component in a form of the eyelet and, the extension element, with its distal end portion loop, with the resilient component manually prying into the open state wherein the hook open end portion is manually disposed within the aperture wherein the hook closed end portion is extended outwardly away from the resilient component outer surface, further shown is the moving of the hook to be outside of the resilient component outer surface when the hook is removed from the retainer apparatus.

Moving onward, FIG. 8 shows a use perspective view of the retainer apparatus 50 showing the resilient component 155 with the slit 170 open in the open state 190 and the outer surface 160 of the resilient component 155, plus the beam 70, the means 205 for retaining the resilient component 155 in a form of the eyelet 230 and the extension element 90, with its distal end portion 100 loop 105, with the resilient component 155 manually prying 245 into the open state 190. FIG. 8 also shows the hook 55 open end portion 60 disposed within the aperture 115 wherein the hook 55 closed end portion 65 is extended outwardly away from the resilient component 155 outer surface 160, further shown is the moving 275 of the hook 55 to be outside of the resilient component 155 outer surface 160.

Figure 9:
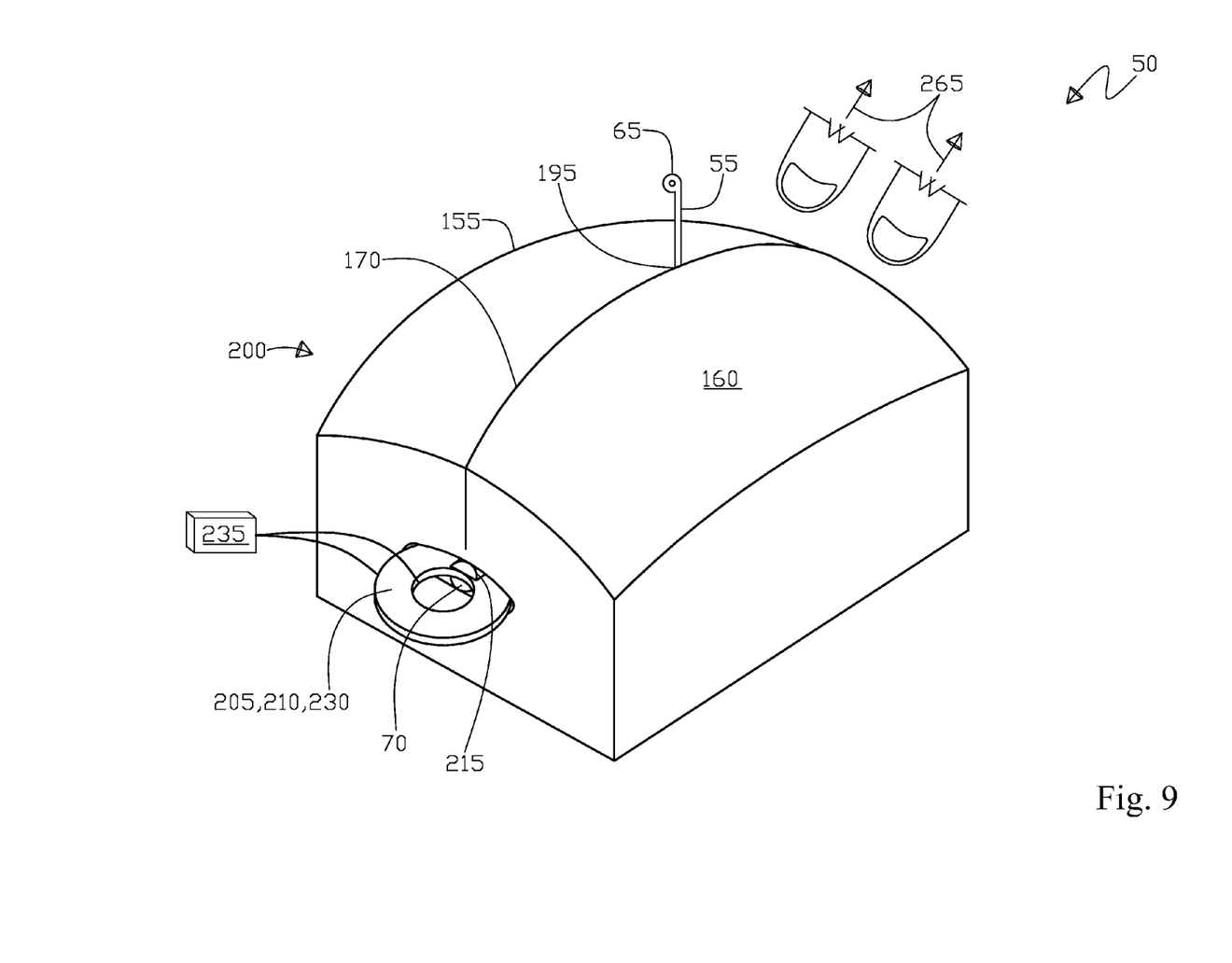
FIG. 9 shows a use perspective view of the retainer apparatus showing the resilient component with the slit split line and outer surface with the resilient component slit in the closed state, plus the beam, and the means for retaining the resilient component in the form of the eyelet, further shown is the hook in particular the closed loop end portion protruding outward from the outer surface of the resilient component, wherein not shown is the hook open end portion being compressively sandwiched by the slit in the closed state.

Continuing, FIG. 9 shows a use perspective view of the retainer apparatus 50 showing the resilient component 155 with the slit 170 split line and outer surface 160 with the resilient component 155 slit 170 in the closed state 200, plus the beam 70, and the means 205 for retaining the resilient component 155 in the form of the eyelet 230. Further shown in use FIG. 9 is the hook 55 in particular the closed loop end portion 65 protruding outward from the outer surface 160 of the resilient component 155 wherein not shown is the hook open end portion 60 being compressively sandwiched 195 by the slit 170 in the closed state 200.

Broadly, in referring to FIGS. 1 to 7, the retainer apparatus 50 for the hook 55, the hook 55 having an open hook end portion 60 and an opposing closed loop end portion 65, see FIGS. 8 and 9, as is shown is the preferable use of a fish hook 55 for the hook 55, or a similar equivalent. The retainer apparatus 50 includes the beam 70 having the longitudinal axis 75, the beam 70 having the first end portion 80 and an opposing second end portion 85 with the longitudinal axis 75 spanning therebetween, as best shown in FIGS. 5 and 7. Further included in the retainer apparatus 50 is the extension element 90 having the proximal end portion 95 and the opposing distal end portion 100, the distal end portion 100 including the generally elongated loop shape 105 that defines the aperture 115, again see FIGS. 5 and 7. Preferably, the extension element elongated loop shape 105 is in the form of a generally elongated wire loop shape 110 for the distal end portion 100, see FIG. 7 in particular. The loop 105 having a major diameter 120 and a minor 125 diameter and a respective major axis 130 and a respective minor axis 135, wherein the proximal end portion 95 is affixed 140 to the beam 70 being positioned such that the major axis 130 is perpendicular 145 to the longitudinal axis 75 and the minor axis 135 is perpendicular 150 to the longitudinal axis 75, again see FIG. 7 in particular.

Also included in the retainer apparatus 50 is the resilient component 155 with the outer surface 160, the resilient component 155 having an internal volume 165 throughout of a resilient material, the volume 165 being sufficient to encompass in a surrounding manner the extension element 90 and a portion of the beam 70 to anchor the extension element 90 within the resilient component 155, see FIGS. 4 to 7. The resilient component 155 having the slit 170 extending from the outer surface 160 inward to the internal volume 165, with the slit 170 extending to a portion of the extension element 90 distal end portion 100, the slit 170 also having a lengthwise axis 175, wherein the lengthwise axis 175 is positioned perpendicular 180 to the minor axis 135 and parallel 185 to the longitudinal axis 75, see FIG. 7 in particular.

Operationally, in looking at the use FIGS. 8 and 9 in particular, the slit 170 extends from the outer surface 160 inward to manually expose via prying 245 open the slit 170 a portion of the extension element 90 distal end portion 100 to allow the hook 55 open end portion 60 to be manually placed or disposed 255 within the slit 170 and then to be disposed therethrough the aperture 115 when the slit 170 is manually placed into an open state 190, see FIG. 8 in particular. Such that when released 265 the slit compressively sandwiches 195 the hook 55 about the extension element 90 distal end portion 100 to removably positively retain the hook 55 open end portion 60 to the aperture 115 when the slit 170 is manually released 265 into the default normally urged closed state 200 such that the slit 170 and the extension element 90 distal end portion 100 are not visible from the outer surface 160, essentially in going from FIG. 8 to FIG. 9. However, as best shown in FIG. 9, with the hook 55 closed loop end portion 65 exposed outside of the outer surface 160 access is available to the user to the hook 55.

Alternatively for the retainer apparatus 50 the beam 70 can further comprise a plurality of extension elements 90 affixed 140 to the beam 70 one after another in a series manner along the longitudinal axis 75 wherein all of the extension elements 90 are each encompassed in a surrounding manner by the resilient component 155 internal volume 165 and a portion of the beam 70 to anchor each extension element 90 within the resilient component 155, see FIGS. 4 to 7.

In addition, optionally for the retainer apparatus 50, the beam 70 can further comprise a means 205 for retaining the resilient component 155 on the beam 70, wherein operationally the means 205 for retaining holds the resilient component 155 in a fixed statically axial position along the longitudinal axis 75 of the beam 70, see FIG. 7 in particular. Further, optionally for the retainer apparatus 50 the means 205 for retaining is preferably constructed of a first expanded section 210 affixed 215 to the beam 70 first end portion 80 wherein the first expanded section 210 is adjacent to a portion of the resilient component 155 outer surface 160 and an opposing second expanded section 220 is affixed 225 to the beam 70 second end portion 85 wherein the second expanded section 220 is adjacent to an opposing portion of the resilient component 155 outer surface 160, see FIG. 7 in particular. Yet, another option for the retainer apparatus 50 is wherein the first expanded section 210 further comprises preferably an eyelet 230 for retaining the retainer apparatus 50 to an article 235, see FIGS. 7, 8, and 9. Further on the retainer apparatus 50 the resilient component 155 is preferably constructed of a closed-cell foam being operational to minimize the absorption of water for floatation of the retainer apparatus 50 in water.

Method of Use

Looking in particular at use FIGS. 8 and 9, a method for using the retainer apparatus 50, includes the steps of firstly providing the hook 55 as previously described and secondly a step of providing the retainer apparatus 50 as previously described. Thirdly, a step of grasping manually 240 the resilient component 155 by the outer surface 160, as shown in FIG. 4. Next, a fourth step of prying open 245 the slit 170 manually from the default normally urged closed state 200 to expose the extension element 90 distal end portion 100 and the aperture 115, thus manually placing the slit 170 into the open state 190, shown in FIG. 8. Further, a fifth step of grasping manually 250 the hook 55 closed loop end portion 65, as shown in FIG. 8. Continuing, a sixth step of inserting manually 255 therethrough the hook 55 open end portion 60 into the aperture 115, as shown in FIG. 8 while holding the prying open step 245.

Next, a seventh step of positioning manually 260 the hook 55 closed loop end portion 65 to be external to the resilient component 155 outer surface 160, as shown in FIGS. 8 and 9. Subsequently, an eighth step of releasing 265 the slit 170 open prying 245 thus allowing the slit 170 to return to the default normally urged closed state 200 such that the slit 170 compressively sandwiches 195 the hook 55 open end portion 60 about the extension element 90 distal end portion 100 to removably positively retain the hook 55 open end portion 60 to the aperture 115, thus operationally removably placing the hook 55 into the retainer apparatus 50 with the slit 170 in the closed state 200 while retaining access to the hook 55 closed loop portion 65 outside of the outer surface 160, as shown in going from FIG. 8 to FIG. 9, however, with the hook 55 open end portion 60 positively retained via the aperture 115 in the retainer apparatus 50, such that resilient friction alone is not relied upon to hold the hook 55 in the retainer apparatus 50.

As an optional step for the method for using the retainer apparatus 50 the third 240, fourth 245, and fifth 250 steps are repeated and then subsequently including steps of removing 270 the hook open end portion 55 from the aperture 115, see FIG. 8, then a step of moving 275 the hook 55 to be outside of the resilient component 155 outer surface 160, again see FIG. 8, and a step of releasing 280 the slit 170 open prying 245 thus allowing the slit 170 to return to the default normally urged closed state 200, thus operationally removing the hook 55 from the retainer apparatus 50, see FIG. 1.

Conclusion

Accordingly, the present invention of the retainer apparatus 50 has been described with some degree of particularity directed to the embodiments of the present invention. It should be appreciated, though, that the present invention is defined by the following claims construed in light of the prior art so modifications the changes may be made to the exemplary embodiments of the present invention without departing from the inventive concepts contained therein.

The invention claimed is:

1. A retainer apparatus for a hook, said hook having an open hook end portion and an opposing closed loop end portion, said retainer apparatus comprising:
    (a) a beam having a longitudinal axis, said beam having a first end portion and an opposing second end portion with said longitudinal axis spanning therebetween;
    (b) an extension element having a proximal end portion and an opposing distal end portion, said distal end portion including a generally elongated loop shape that defines an aperture, said loop having a major diameter and a minor diameter and a respective major axis and a respective minor axis, wherein said proximal end portion is affixed to said beam being positioned such that said major axis is perpendicular to said longitudinal axis and said minor axis is perpendicular to said longitudinal axis; and
    (c) a resilient component with an outer surface, said resilient component having an internal volume throughout of a resilient material, said volume being sufficient to encompass in a surrounding manner said extension element and a portion of said beam to anchor said extension element within said resilient component, said resilient component having a slit extending from said outer surface inward to said internal volume, said slit extending to a portion of said extension element distal end portion, said slit having a lengthwise axis, said lengthwise axis is positioned perpendicular to said minor axis and parallel to said longitudinal axis, operationally said slit extends from said outer surface inward to manually expose a portion of said extension element distal end portion to allow the hook open end portion to be manually placed within said slit and then to be disposed therethrough said aperture when said slit is manually placed into an open state, such that when released said slit compressively sandwiches said hook about said extension element distal end portion to removably positively retain the hook open end portion to said aperture when said slit is manually released into a default normally urged closed state such that said slit and said extension element distal end portion are not visible from said outer surface, while retaining access to the hook closed loop portion outside of said outer surface.

2. A retainer apparatus for a hook according to claim 1 wherein said beam further comprises a plurality of extension elements affixed to said beam one after another in a series manner along said longitudinal axis.

3. A retainer apparatus for a hook according to claim 1 further wherein said beam further comprises a means for retaining said resilient component on said beam, wherein operationally said means for retaining holds said resilient component in a fixed statically axial position along said longitudinal axis of said beam.

4. A retainer apparatus for a hook according to claim 3 wherein said means for retaining is constructed of a first expanded section affixed to said beam first end portion wherein said first expanded section is adjacent to a portion of said resilient component outer surface and a second expanded section affixed to said beam second end portion wherein said second expanded section is adjacent to an opposing portion of said resilient component outer surface.

5. A retainer apparatus for a hook according to claim 4 wherein said first expanded section further comprises an eyelet for retaining said retainer apparatus to an article.

6. A retainer apparatus for a hook according to claim 1 wherein said resilient component is constructed of a closed-cell foam being operational to minimize the absorption of water for floatation of said retainer apparatus in water.

7. A retainer apparatus for a hook, said hook having an open hook end portion and an opposing closed loop end portion, said retainer apparatus comprising:
(a) a beam having a longitudinal axis, said beam having a first end portion and an opposing second end portion with said longitudinal axis spanning therebetween, said beam also having a first expanded section affixed to said beam first end portion and a second expanded section affixed to said beam second end portion, said first and second expanded sections extend in a manner perpendicular and outward from said longitudinal axis;
(b) an extension element having a proximal end portion and an opposing distal end portion, said distal end portion including a generally elongated wire loop shape that defines an aperture, said loop having a major diameter and a minor diameter and a respective major axis and a respective minor axis, wherein said proximal end portion is affixed to said beam being positioned such that said major axis is perpendicular to said longitudinal axis and said minor axis is perpendicular to said longitudinal axis; and
(c) a resilient component with an outer surface, said resilient component having an internal volume throughout of a resilient material, said volume being sufficient to encompass in a surrounding manner said extension element and a portion of said beam to anchor said extension element within said resilient component, said resilient component having a slit extending from said outer surface inward to said internal volume, said slit extending to a portion of said extension element distal end portion, said slit having a lengthwise axis, said lengthwise axis is positioned perpendicular to said minor axis and parallel to said longitudinal axis, said first expanded section is adjacent to a portion of said resilient component outer surface and said second expanded section is adjacent to a portion of said resilient component outer surface, said first and second expanded sections hold said resilient component in a fixed statically axial position along said longitudinal axis of said beam, operationally said slit extends from said outer surface inward to expose a portion of said extension element distal end portion to allow the hook open end portion to be manually placed within said slit and then to be disposed therethrough said aperture when said slit is manually placed into an open state such when manually released said slit compressively sandwiches said hook about said extension element distal end portion to removably positively retain the hook open end portion to said aperture, when said slit is manually released into a default normally urged closed state such that said slit and said extension element distal end portion are not visible from said outer surface, while retaining access to the hook closed loop portion outside of said outer surface.

8. A retainer apparatus for a hook according to claim 7 wherein said beam further comprises a plurality of extension elements affixed to said beam one after another in a series manner along said longitudinal axis.

9. A retainer apparatus for a hook according to claim 7 wherein said first expanded section further comprises an eyelet for retaining said retainer apparatus to an article.

10. A retainer apparatus for a hook according to claim 7 wherein said resilient component is constructed of a closed-cell foam being operational to minimize the absorption of water for floatation of said retainer apparatus in water.

11. A method for using a retainer apparatus, comprising the steps of:
(a) providing a hook that includes an open hook end portion and an opposing closed loop end portion;
(b) providing a retainer apparatus that includes a beam having a longitudinal axis, said beam having a first end portion and an opposing second end portion with said longitudinal axis spanning therebetween, said beam also having a first expanded section affixed to said beam first end portion and a second expanded section affixed to said beam second end portion, said first and second expanded sections extend in a manner perpendicular and outward from said longitudinal axis, further included in said retainer apparatus is an extension element having a proximal end portion and an opposing distal end portion, said distal end portion including a generally elongated wire loop shape that defines an aperture, said loop having a major diameter and a minor diameter and a respective major axis and a respective minor axis, wherein said proximal end portion is affixed to said beam being positioned such that said major axis is perpendicular to said longitudinal axis and said minor axis is perpendicular to said longitudinal axis, also included in said retainer apparatus is a resilient component with an outer surface, said resilient component having an internal volume throughout of a resilient material, said volume being sufficient to encompass in a surrounding manner said extension element and a portion of said beam to anchor said extension element within said resilient component, said resilient component having a slit extending from said outer surface inward to said internal volume, said slit extending to a portion of said extension element distal end portion, said slit having a lengthwise axis, said lengthwise axis is positioned perpendicular to said minor axis and parallel to said longitudinal axis, said first expanded section is adjacent to a portion of said resilient component outer surface and said second expanded section is adjacent to a portion of said resilient component outer surface, said first and second expanded sections hold said resilient component in a fixed statically axial position along said longitudinal axis of said beam, operationally said slit extends from said outer surface inward to manually expose a portion of said extension element distal end portion to allow said hook open end portion to be manually placed within said slit and then to be disposed therethrough said aperture when said slit is manually placed into an open state such when manually released said slit compressively sandwiches said hook about said extension element distal end portion to removably positively retain the hook open end portion to said aperture, resulting from when said slit is manually released into a default normally urged closed state such that said slit and said extension element distal end portion are not visible from said outer surface, while retaining access to the hook closed loop portion outside of said outer surface;

(c) grasping manually said resilient component by said outer surface;

(d) prying open said slit manually from said default normally urged closed state to expose said extension element distal end portion and said aperture thus manually placing said slit into said open state;

(e) grasping manually the hook closed loop end portion;

(f) inserting manually therethrough the hook open end portion into said aperture;

(g) positioning manually the hook closed loop end portion to be external to said resilient component outer surface; and (h) releasing said slit open prying thus allowing said slit to return to said default normally urged closed state such that said slit compressively sandwiches the hook open end portion about said extension element distal end portion to removably positively retain the hook open end portion to said aperture, thus operationally removably placing the hook into said retainer apparatus with said slit in said closed state, while retaining access to the hook closed loop portion outside of said outer surface.

12. A method for using a retainer apparatus according to claim 11 wherein said steps (c), (d), and (e) are repeated and subsequently including steps of removing said hook open end portion from said aperture, then a step of moving said hook to be outside of said resilient component outer surface, and a step of releasing said slit open prying thus allowing said slit to return to said default normally urged closed state, thus operationally removing said hook from said retainer apparatus.

* * * * *